United States Patent [19]

Hara

[11] Patent Number: 5,449,019
[45] Date of Patent: Sep. 12, 1995

[54] UNIT CONSISTING OF ELECTROMAGNETIC VALVES

[75] Inventor: Masahiko Hara, Atsugi, Japan

[73] Assignee: Unisia Jecs Corporation, Atsugi, Japan

[21] Appl. No.: 129,587

[22] Filed: Sep. 30, 1993

[30] Foreign Application Priority Data

Oct. 2, 1992 [JP] Japan .................... 4-068878 U

[51] Int. Cl.$^6$ ................. F15B 13/08; F16K 11/24
[52] U.S. Cl. ................. 137/596.17; 137/884; 303/119.2
[58] Field of Search ............ 137/596.17, 884; 303/119.2

[56] References Cited

U.S. PATENT DOCUMENTS 4,785,848 11/1988 Leiber ............... 137/596.17

FOREIGN PATENT DOCUMENTS 63-96378 4/1988 Japan.

Primary Examiner—Gerald A. Michalsky
Attorney, Agent, or Firm—Bachman & LaPointe

[57] ABSTRACT

A unit comprises a valve housing having a bottom portion; and a plurality of electromagnetic valves standing on the bottom of the valve housing. Each electromagnetic valve includes a coil which is housed in a housing structure. A cover member is put on head portions of the electromagnetic valves. A bolt extends from the cover member to the bottom portion of the valve housing to bias the cover member toward the bottom portion of the valve housing thereby to tightly fix the electromagnetic valves to the valve housing. A printed-circuit board is positioned above the cover member. Bracket portions for supporting the printed circuit board extend upward from the housing structure toward the printed-circuit board while keeping away from a lateral end of the cover member. Conductive lines are embedded in each bracket portion to provide an electric connection between each coil and the circuit of the printed-circuit board.

9 Claims, 3 Drawing Sheets

UNIT CONSISTING OF ELECTROMAGNETIC VALVES

BACKGROUND OF THE INVENTION

1. Field of the Invention

The present invention relates in general to electromagnetic valves used, for example, in a motor vehicle, and more particularly to a unit consisting of electromagnetic valves used for controlling an anti-lock braking system of the motor vehicle.

2. Description of the Prior Art

In order to clarify the task of the present invention, one conventional unit consisting of electromagnetic valves for such anti-lock braking system (viz., ABS) will be outlined with reference to FIG. 3 of the accompanying drawings, which is shown in Japanese Patent First Provisional Publication 63-96378.

In FIG. 3, there is shown a sectional and partial view of the conventional unit. Numeral 20 designates a valve housing, and numerals 21A and 21B designate electromagnetic valves which have valve proper portions 22 held by the valve housing 20. Numerals 23A and 23B designate respective coils possessed by the electromagnetic valves 21A and 21B, and numeral 24 designates liquid passages formed in the valve housing 20. Each coil 23A or 23B is tightly held in a bobbin 25A or 25B. As shown, each coil 23A or 23B and the associated bobbin 25A or 25B are surrounded by an outer wall 26. Mounted on a top of the outer wall 26 is a cover member 27 which tightly holds upper portions of the electromagnetic valves 21A and 21B. For the tight holding of the valves 21A and 21B, the cover member 27 is formed with openings 31 into which the upper portions of the valves 21A and 21B are fitted. The cover member 27 carries thereon a printed-circuit board 28. The printed circuit on the board 28 includes power lines and control lines for the electromagnetic valves 21A and 21B. Numerals 29 and 29 designate terminals from the coils 23A and 23B, which are connected via welding or the like to given portions of the printed circuit. Numeral 30 designates a housing cover which is mounted on the valve housing 20 to cover and protect the electromagnetic valves 21A and 21B and the printed-circuit board 28.

However, due to its inherent construction, the above-mentioned conventional unit has the following drawbacks.

That is, because the printed-circuit board 28 is positioned at an opposite side of the coils 23A and 23B with respect to the cover member 27, the cover member 27 has to have openings (not shown) through which the terminals 29 and 29 from the coils 23A and 23B pass toward the printed-circuit board 28. However, provision of such openings in the cover member 27 in addition to the openings 31 for the electromagnetic valves 1A and 1B not only lowers the mechanical strength of the cover member 27 but also induces a difficulty with which the cover member 27 is produced.

SUMMARY OF THE INVENTION

It is therefore an object of the present invention to provide a unit consisting of electromagnetic valves, which is free of the above-mentioned drawbacks.

According to a first aspect of the present invention, there is provided a unit which comprises a valve housing having a bottom portion; a plurality of electromagnetic valves standing on the bottom of the valve housing, each electromagnetic valve including a coil which is housed in a housing structure; a cover member put on head portions of the electromagnetic valves; fixing means for biasing the cover member toward the bottom of the valve housing thereby to tightly fix the electromagnetic valves to the valve housing; a printed-circuit board positioned above the cover member; bracket portions for supporting the printed-circuit board, each bracket portion extending upward from the housing structure toward the printed-circuit board while keeping away from a lateral end of the cover member; and conductive lines embedded in each bracket portion to provide an electric connection between each coil and the circuit of the printed-circuit board.

According to a second aspect of the present invention, there is provided a unit which comprises a valve housing having a bottom portion; a plurality of paired electromagnetic valves standing on the bottom of the valve housing, each electromagnetic valve including a coil which is housed in a housing structure; a cover member put on head portions of the electromagnetic valves; at least one bolt extending from the cover member to the bottom portion of the valve housing to bias the cover member toward the bottom portion thereby to tightly fix the electromagnetic valves to the valve housing; a printed-circuit board positioned above the cover member, the board having an aperture through which a head of the bolt is raised upward; bracket portions each extending upward from the housing structure toward the printed-circuit board while keeping away from a lateral end of the cover member, the bracket portions supporting the printed-circuit board at their tops; conductive lines embedded in each of the bracket portions to provide an electric connection between each coil and the circuit of the printed-circuit board.

BRIEF DESCRIPTION OF THE DRAWINGS

Other objects and advantages of the present invention will be clarified from the following description when taken in conjunction with the accompanying drawings, in which.

DETAILED DESCRIPTION OF THE INVENTION

Figure 1:
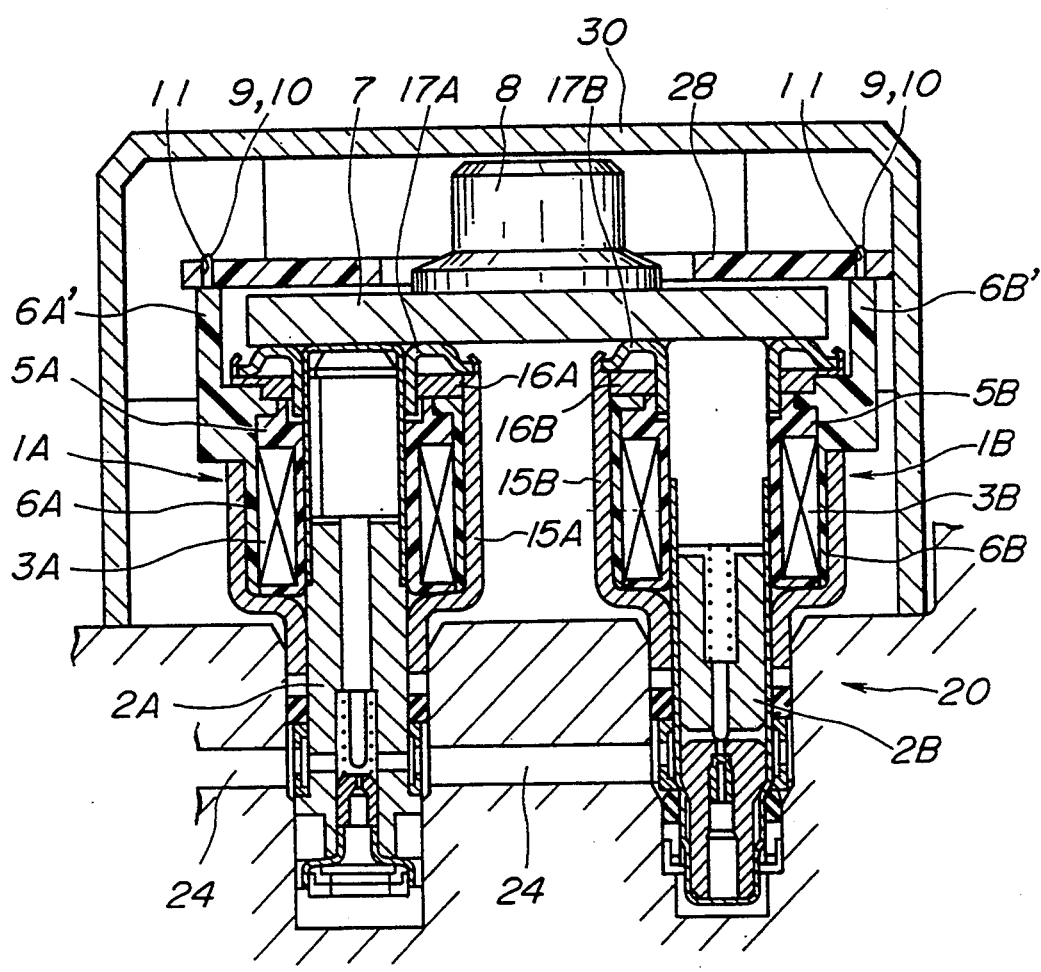
FIG. 1 is a sectional view of a unit consisting electromagnetic valves, according to the present invention, the view being taken along the line X—X of FIG. 2.
Figure 2:
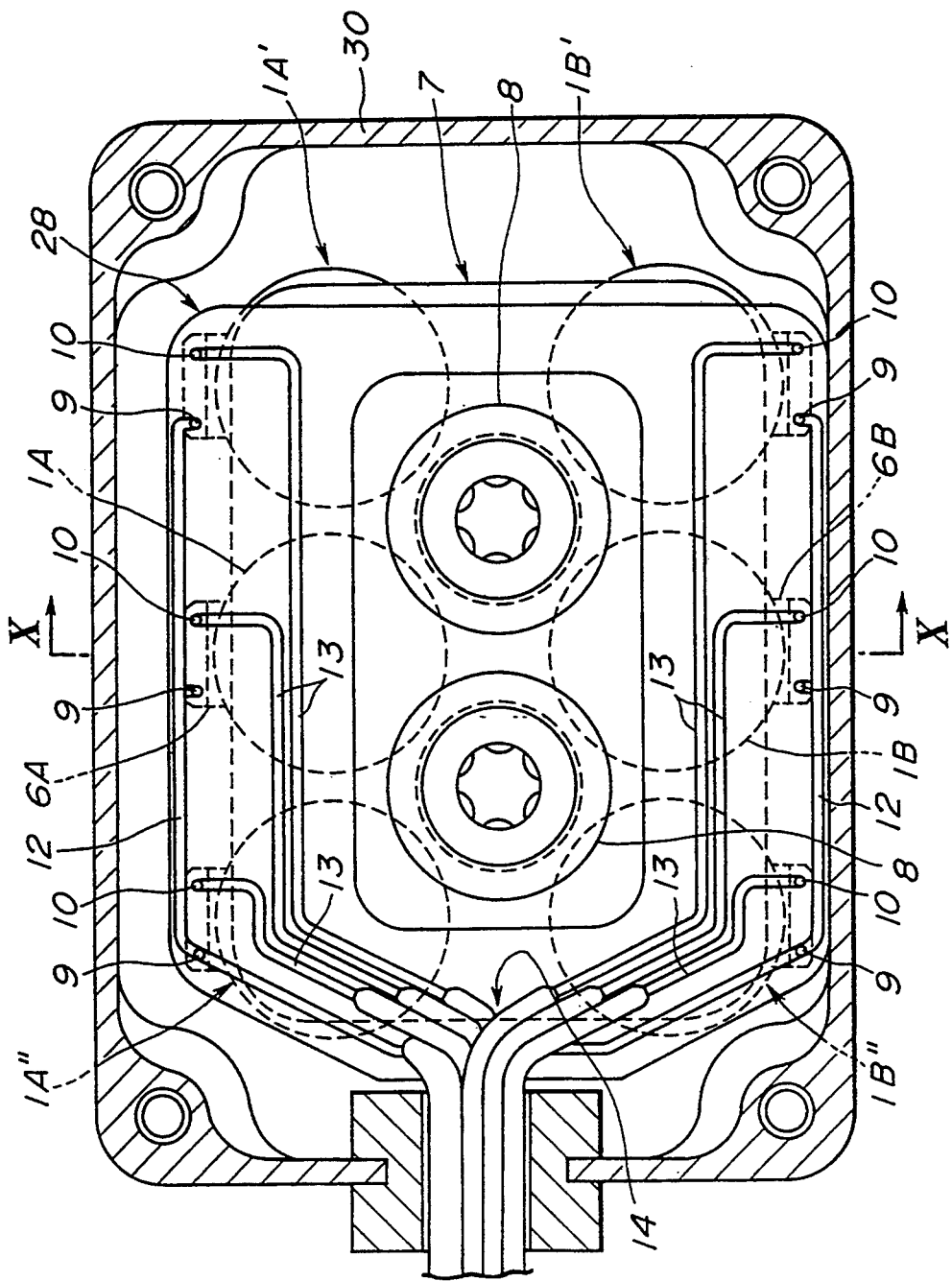
FIG. 2 is a plan view of the unit according to the present invention.
Figure 3:
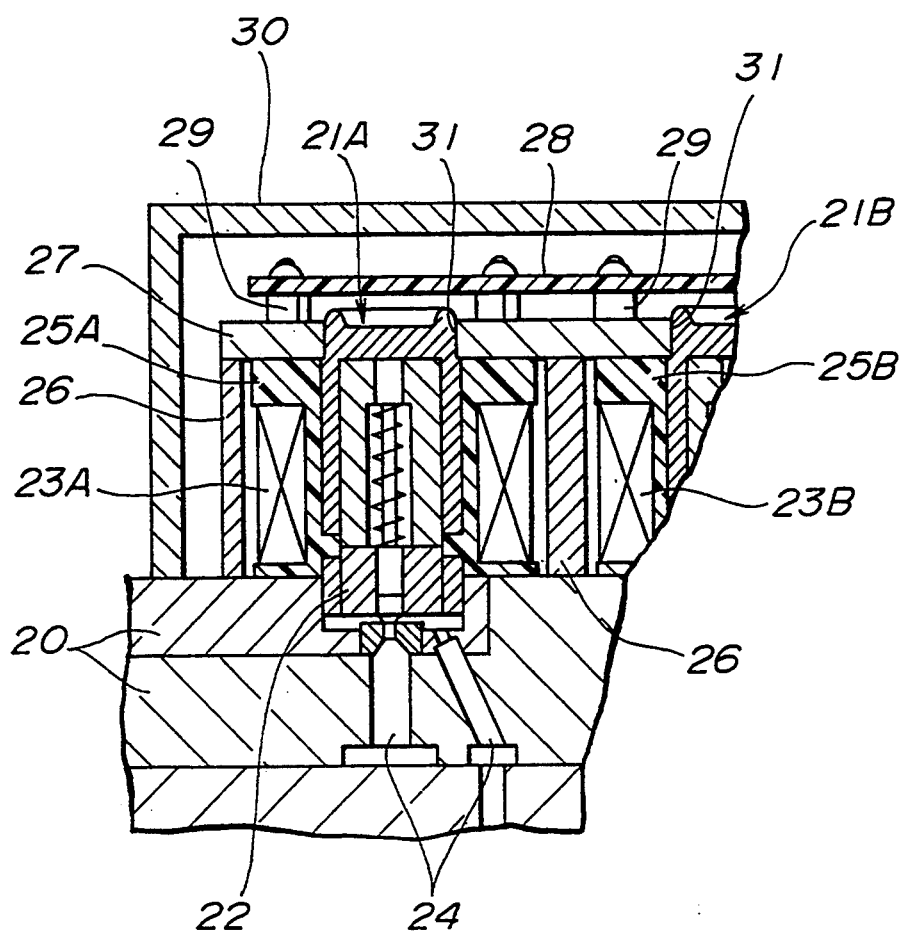
FIG. 3 is a sectional view of a conventional unit.

Referring to FIGS. 1 and 2, there is shown a unit consisting of electromagnetic valves, which is an embodiment of the present invention.

As will be seen from FIG. 2, the unit consists of three pairs of electromagnetic valves, which are the center pair 1A and 1B, the right pair 1A' and 1B' and the left pair 1A" and 1B". These three pairs are arranged in parallel.

Although not shown in the drawings, the unit of the invention is used in an anti-lock braking system of three-line type. That is, in this braking system, three hydraulic lines are employed which are a line between a common brake master cylinder and a front-right road wheel, a line between the master cylinder and a front-left road wheel and a line between the master cylinder and two rear wheels. Each line includes a first electromagnetic valve arranged between the master cylinder and a wheel brake cylinder of the corresponding road wheel and a second electromagnetic valve arranged between the wheel brake cylinder and a common reservoir tank.

It is to be noted that the first and second electromagnetic valves constitute the paired electromagnetic valves 1A and 1B, 1A' and 1B', or 1A" and 1B".

Since these three pairs of electromagnetic valves 1A and 1B, 1A' and 1B' and 1A" and 1B" are substantially the same in construction, the following description will be directed mainly to the center pair 1A and 1B for simplification of explanation.

As is seen from FIG. 1 which is a sectional view taken along the line X—X of FIG. 2, the unit of the invention comprises a valve housing 20 which is formed at its bottom portion with blind bores (no numerals) into which valve proper portions 2A and 2B of the electromagnetic valves 1A and 1B are tightly inserted. The valve housing 20 is formed with liquid passages 24 and 24 through which the two valves 1A and 1B are fluidly connected to an associated hydraulic line of the antilock braking system.

Numerals 3A and 3B designate coils which surround upper portions of the valve proper portions 2A and 2B. Each coil 3A or 3B is housed in a housing structure which consists of a bobbin 5A or 5B and a bobbin cover 6A or 6B. More specifically, the coil 3A or 3B, the bobbin 5A or 5B and the bobbin cover 6A or 6B are integrally molded to constitute a monoblock coil unit. The monoblock coil unit is intimately surrounded by a cylindrical outer wall 15A or 15B. An annular plate 16A or 16B is coaxially put on the bobbin 5A or 5B, and an annular lid 17A or 17B is coaxially put on the annular plate 16A or 16B. The plate 16A or 16B and the lid 17A or 17B are tightly gripped by an upper portion of the cylindrical outer wall 15A or 15B, as shown. The lids 17A and 17B thus constitute head portions of the electromagnetic valves 1A and 1B.

As shown in FIG. 1, from each monoblock coil unit, more specifically, from the bobbin cover 6A or 6B, there extends a bracket portion 6A' or 6B' which is projected upward beside a lateral end of the cover member 7.

Two lead wires (not shown) from the coil 3A or 3B are embedded in the bobbin 5A or 5B and the bracket portion 6A' or 6B' and have leading ends exposed to the outside at the top of the bracket portion 6A' or 6B'. The exposed leading ends of the lead wires have terminal pins 9 and 10 connected thereto. Preferably, the terminal pins 9 and 10 are tightly held by the bracket portion 6A' or 6B'.

A cover member 7 is placed on the head portions of the electromagnetic valves 1A and 1B. As shown, each bracket portion 6A' or 6B' extends upward beside the cover member 7 while keeping a space therebetween. The cover member 7 is pressed against the head portions of the electromagnetic valves 1A and 1B by a bolt 8 (only bolt head is illustrated in FIG. 1) which extends from the cover member 7 to the valve housing 20. Thus, the valves 1A and 1B are tightly held by the valve housing 20.

As will be understood from FIG. 2, the cover member 7 is rectangular in shape and large enough to press all the three pairs of electromagnetic valves 1A and 1B, 1A' and 1B' and 1A" and 1B", and two bolts 8 and 8 are used for the tight holding of the valves 1A and 1B.

As is seen from FIG. 1, a rectangular printed-circuit board 28 is mounted on the tops of the bracket portions 6A' and 6B'. As shown in FIG. 2, the board 28 includes printed power lines 12 and printed control lines 13. These printed lines 12 and 13 are connected respectively to covered wires at one end 14 of the printed circuit board 28. The covered wires are led to a control box (not shown) of the anti-skid braking system.

As is seen from FIG. 2, the printed-circuit board 28 has a rectangular aperture (no numeral) through which, as is shown in FIG. 1, the heads of the two bolts 8 and 8 are raised upward.

The printed-circuit board 28 is formed at laterally opposed edge portions with paired openings (no numerals) into which the terminal pins 9 and 10 from the bracket portions 6A' and 6B' are inserted. Leading ends of the terminal pins 9 and 10 are projected from the openings, as shown.

As is seen from FIG. 2, the projected ends of the terminal pins 9 are welded to the printed power lines 12, while, the projected ends of the other terminal pins 10 are welded to the control lines 13.

It is to be noted that similar wiring and welding are also applied to the other two pairs of electromagnetic valves 1A' and 1B', and 1A" and 1B".

As shown in FIG. 1, a housing cover 30 is mounted on the valve housing 20 to cover and protect the three pairs of electromagnetic valves 1A and 1B, 1A' and 1B' and 1A" and 1B", and the printed-circuit board 28.

As will be understood from the foregoing description, in the present invention, the printed-circuit board 28 is supported by the bracket portions 6A' and 6B' which extend beside the lateral ends of the cover member 7. That is, in accordance with the invention, there is no need of providing the cover member 7 with a plurality of openings for the terminals from the coils and the electromagnetic valves. Thus, the cover member 7 has a sufficient mechanical strength and can be produced easily.

What is claimed is:

1. A unit comprising:

a valve housing having a bottom portion;

a plurality of electromagnetic valves standing on the bottom portion of said valve housing, each electromagnetic valve including a coil which is housed in a housing structure and a head portion;

a cover member put on the head portions of said electromagnetic valves, said cover member having solid portions thereof against which said head portions of said electromagnetic valves abut;

fixing means for producing a biasing force by which said cover member is biased toward said bottom of said valve housing thereby to tightly fix said electromagnetic valves to said valve housing;

a printed-circuit board positioned above said cover member;

bracket portions for supporting said printed-circuit board, each bracket portion being integral with said housing structure and extending therefrom upward toward said printed-circuit board to support the same while keeping away from a lateral end of said cover member; and conductive lines embedded and extending in each bracket portion to provide an electric connection between each coil and the circuit of said printed-circuit board.

2. A unit as claimed in claim 1, further comprising:

a pair of terminal pins mounted on a top of each bracket portion, said pins being connected to the conductive lines in the bracket portion;

means defining in an edge portion of said printed-circuit board paired openings into which said terminal pins are inserted; and means for welding said terminal pins to given portions of the circuit of said printed-circuit board.

3. A unit as claimed in claim 2, in which said fixing means is a bolt which extends from said cover member to the bottom portion of said valve housing.

4. A unit as claimed in claim 3, in which said printed-circuit board is formed with an aperture through which a head portion of said bolt is raised upward.

5. A unit as claimed in claim 1, in which said valve housing is formed with a liquid passage through which the electromagnetic valves are fluidly connected.

6. A unit as claimed in claim 1, further comprising a housing cover which is mounted on said valve housing to cover and protect said electromagnetic valves and said printed-circuit board.

7. The unit according to claim 1, wherein the cover member is substantially entirely solid and is provided only with openings for receiving bolts for pressing the cover against the electromagnetic valves.

8. The unit according to claim 1, wherein the cover member has a surface extending in a plane substantially adjacent each of said head portions of said electromagnetic valves and each of said valves further include a lid portion, wherein said plane of said surface is not traversed by said head and lid portions.

9. A unit comprising:

a valve housing having a bottom portion;

a plurality of paired electromagnetic valves standing on the bottom portion of said valve housing, each electromagnetic valve including a coil and a housing structure in which said coil is housed;

a cover member put on head portions of said electromagnetic valves;

a least one bolt extending from said cover member to the bottom portion of said valve housing, said bolt, when turned in a given direction, producing a biasing force by which said cover member is biased toward said bottom portion thereby to tightly fix the electromagnetic valves to the valve housing;

a printed-circuit board positioned above said cover member, said board having an aperture through which an enlarged head of said bolt is raised upward;

bracket portions for supporting said printed circuit board, each bracket portion being integral with said housing structure of the electromagnetic valve and extending therefrom upward toward a lateral end of said printed-circuit board to support the board while keeping away from a lateral end of said cover member; and conductive lines embedded and extending in each bracket portion to provide an electric connection between each coil and the circuit of the printed-circuit board.

* * * * *